United States Patent [19]

White, Jr.

[11] Patent Number: 4,818,200

[45] Date of Patent: Apr. 4, 1989

[54] HYDROSTATIC STEERING DEVICE HAVING THE CONTROL VALVE WITHIN THE ROTOR

[76] Inventor: Hollis N. White, Jr., 243 Pyle La., Hopkinsville, Ky. 42240

[21] Appl. No.: 142,301

[22] Filed: Dec. 28, 1987

Related U.S. Application Data

[63] Continuation of Ser. No. 883,980, Jul. 17, 1986, abandoned, which is a continuation-in-part of Ser. No. 812,443, Dec. 23, 1985, abandoned, which is a continuation-in-part of Ser. No. 763,001, Aug. 6, 1985, abandoned.

[51] Int. Cl.$^4$ ............... B62D 5/083; B62D 5/097; F04C 2/10; F15B 13/04
[52] U.S. Cl. ........................... 418/61.3; 418/187; 60/384; 91/375 R; 91/434; 180/132; 180/149; 137/625.21; 137/625.23; 137/625.24
[58] Field of Search ............... 418/61 B, 186, 187; 60/384; 91/375 R, 375 A, 434; 180/132, 149; 137/625.21, 625.23, 625.24

[56] References Cited

U.S. PATENT DOCUMENTS

| | | | |
|---|---|---|---|
| 2,899,937 | 8/1959 | Nuebling | 91/375 R |
| 4,057,079 | 11/1977 | Taig | 137/625.23 |
| 4,169,515 | 10/1979 | Presley | 91/375 A |
| 4,474,544 | 10/1984 | White, Jr. | 418/186 |
| 4,533,303 | 8/1985 | Petersen et al. | 418/61 B |

FOREIGN PATENT DOCUMENTS

3410832 9/1985 Fed. Rep. of Germany .... 418/61 B

Primary Examiner—John J. Vrablik
Attorney, Agent, or Firm—Woodling, Krost and Rust

[57] ABSTRACT

An improved hydrostatic steering mechanism is disclosed having a rotary valve with a radially displaced resilient feedback mechanism.

13 Claims, 12 Drawing Sheets

HYDROSTATIC STEERING DEVICE HAVING THE CONTROL VALVE WITHIN THE ROTOR

This present application is a continuation of co-pending application Ser. No. 883,980 filed on July 17, 1986, abandoned, which was a continuation-in-part of Mr. White's prior abandoned hydrostatic steering unit application Ser. No. 812,443 filed Dec. 23, 1985. This application Ser. No. 812,443 in turn was a continuation-in-part of abandoned Ser. No. 763,001 filed Aug. 6, 1985 abandoned.

This invention relates to an improved power steering device.

It is an object of this invention to reduce the physical size of hydrostatic steering devices.

It is an object of this invention to simplify the construction of hydrostatic steering devices.

It is an object of this invention to increase the the strength of hydrostatic steering devices.

It is an object of this invention to reduce the cost of hydrostatic steering devices.

It is an object of this invention to increase the adaptability of hydrostatic steering devices.

It is an object of this invention to allow for active manipulation of the parameters of hydrostatic steering devices.

It is an object of this invention to improve the tactile sensation of hydrostatic steering devices.

Other objects and advantages of the present invention will be apparent from the accompanying description and drawings in which.

Figure 1:
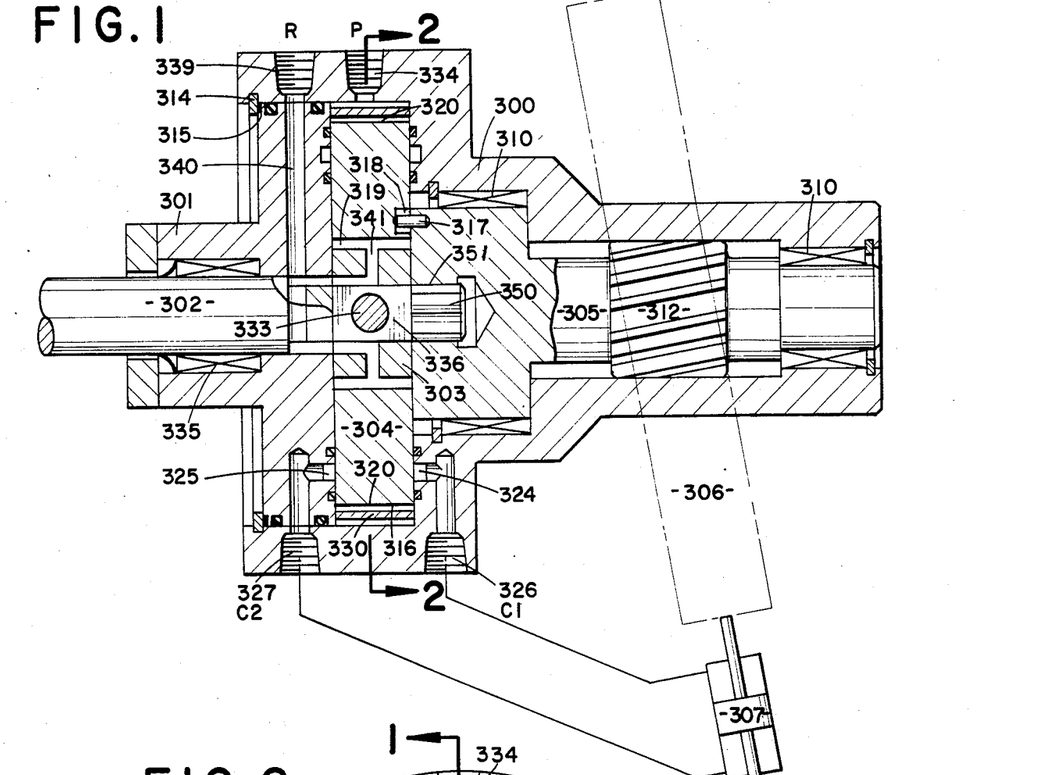
FIG. 1 is a central longitudinal cross-sectional view of a hydrostatic rack and pinion steering device taken along lines 1—1 in FIG. 2.

Referring now to FIG. 1, the hydrostatic steering device includes a body 300, an insert 301, a drive shaft 302, a valve seat 303, a valve member 304, a pinion shaft 305, a rack 306 and a cylinder 307. The body 300 and insert 301 are formed of cast steel.

The pinion shaft 305 is rotatably mounted within the body 300 of the device by bearings 310. The pinion 312 of the pinion shaft 305 engages the rack 306 of the steering device. The insert 301 is mounted within the other end of the body 300 of the device. A snap ring 314 holds the insert 301 within the body 300 of the device. A wave spring 315 provides pressure on both sides of the valve member 304 captured between the insert 301 and body 300 of the device.

The valve member 304 is captured in a valve cavity 316 between the insert 301 and the body 300 of the device. The valve member 304 is rotatably connected to the pinion shaft 305 via small pin 317. The small pin 317 is fixedly connected to the pinion shaft 305 for rotation therewith. The pin 317 engages the valve member 304 in a radially extending slot 318. This slot allows the valve member 304 to float in respect to the pinion shaft 305 while at the same time rotating therewith (i.e. the rotational axis of the pinion shaft 305 need not correspond to the rotational axis of the valve member 304).

Figures 2, 3, 4:
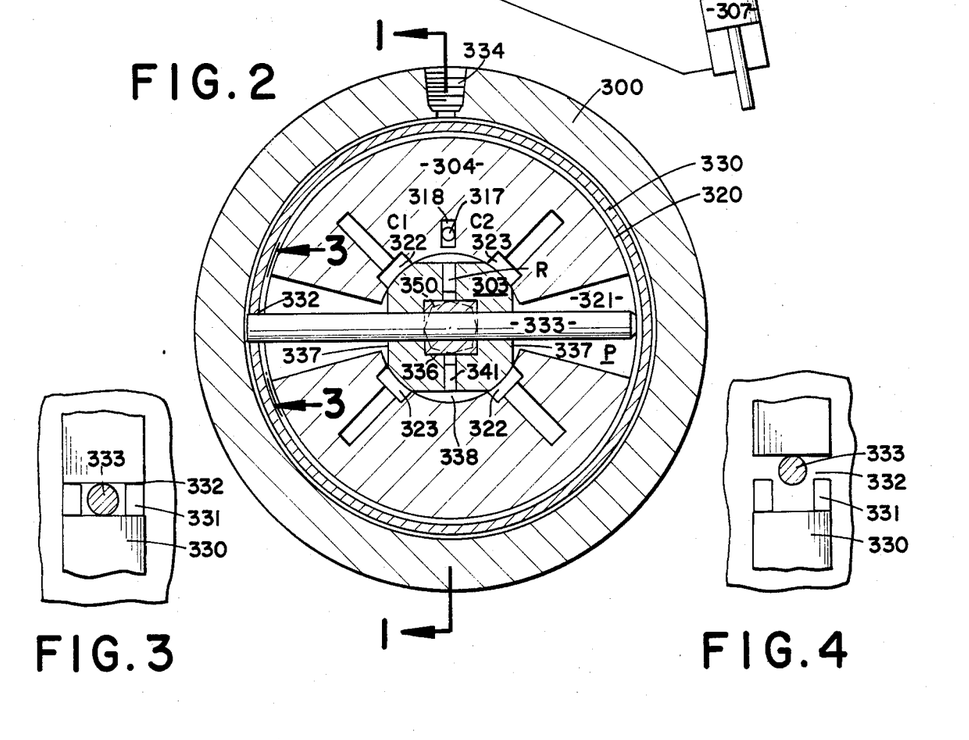
FIG. 2 is a cutaway cross-sectional view of the device of FIG. 1 taken generally along lines 2—2 of that figure.
FIGS. 3 and 4 are partial sectional views of the torsion connection of the device of FIG. 1 taken generally along lines 3—3 in FIG. 2.

The valve member 304 has a central core 319, an outer diameter 320 and a drive cavity 321. Two pairs of symmetrically placed valving passages C1(322), C2(323) lead from the central core 319 of the valve member 304 to the facing surfaces of the valve cavity 316 from whence they communicate through two circular grooves 324, 325 in the body 300 and insert 301 of the device and two ports 326, 327 in the body 300 of the device to opposing sides of the cylinder 307. A "C" shaped torsion member 330 surrounds the outer diameter 320 of the valve member 304. Two small tabs 331 extending off of the valve member 304 extend into the opening 332 of the "C" shaped torsion member 330 (for reasons to be later described). The drive cavity 321 extends generally butterfly shaped through the central part of the valve member 304. The drive cavity 321 allows clearance for the movement of the heavy pin 333 (as will be later described). The drive cavity 321 also is the fluid passageway between the pressure port 334 in the body of the device and the valve (again to be later described).

The drive shaft 302 is rotatably mounted to the insert 301 of the device by bearing 335. The valve seat 303 is located within the central core 319 of the valve member 304 fixedly connected on a square section 336 of the drive shaft 302 for rotation therewith. The valve seat 303 includes a pair of opposed pressure grooves 337 (fed by the pressure port 334 through the drive cavity 321 of the valve member 304) and a pair of opposed return grooves 338 (fed from the return port 339 through passageway 340 in the insert 301 and the hole 341 through the valve seat 303). The valve member 304 and valve seat 303 together comprise the valve for the device. This valve is a rotary control valve.

The heavy pin 333 extends through the square section 336 of the drive shaft 302, the valve seat 303 and the drive cavity 321 into the opening 332 in the "C" shaped torsion member 330. The heavy pin 333 and torsion member 330 provide the torsion connection of the device. A separate cutaway square shaped point 350 on the drive shaft 302 fits into a square shaped hole 351 in the pinion shaft 305 to provide for the safety interconnection between the drive shaft 302 and pinion shaft 305.

Figure 5:
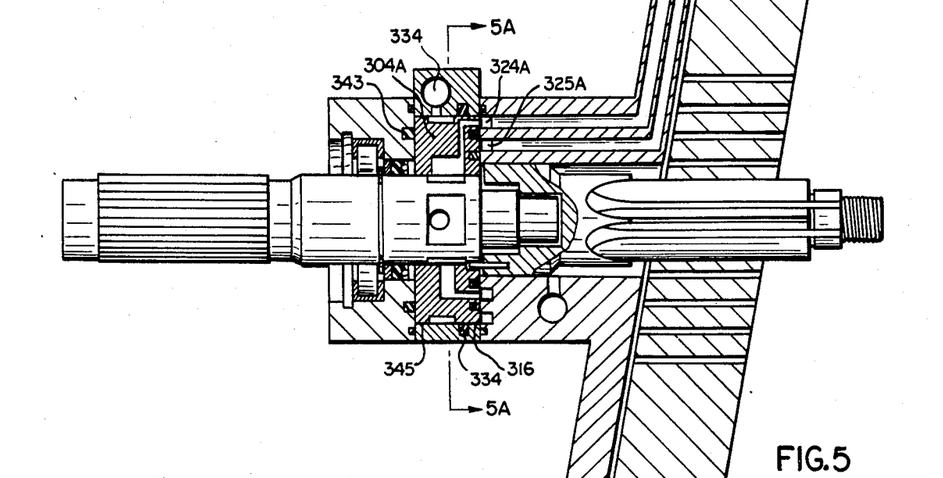
FIGS. 5 and 6 central longitudinal cross-sectional views of hydrostatic rack and pinion steering devices like FIG. 1 utilizing pressure balancing and integral passage features.
Figure 5A:
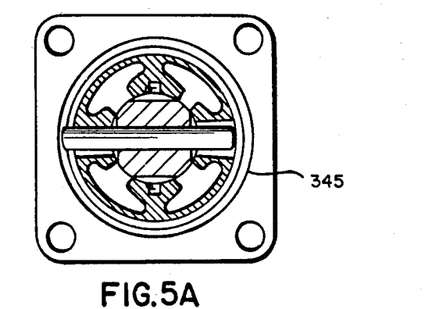
FIG. 5A is a partial cross-sectional view of the valve member of the steering device of FIG. 5 taken along lines 5A—5A in FIG. 5.

In operation one rotates the drive shaft 302 in the direction desired. This rotation serves to rotate the valve seat 303 within the valve member 304 against the pressure of the "C" shaped torsion member 330 (the end of the heavy pin 333 within the opening 332 in the torsion member 330 moves in respect to the tabs 331 of the valve member 304 to provide a springing force—contrast FIG. 3 with FIG. 4). The rotation of the valve seat 303 within the valve member 304 connects the pressure groove 337 of the valve seat 303 with one of the surrounding C1 or C2 grooves (322 or 323 respectively) and the return groove 338 with the other of the surrounding C1 or C2 grooves. This fluid valving causes the cylinder 307 and rack 306 to move which in turn causes the pinion shaft 305 to rotate. This rotation moves the valve member 304 through the pin 317-slot 318 connection to a new neutral position, thus completing movement of the steering system. In the rare event of system failure the direct lost-motion type connection 350-351 between the drive shaft 302 and pinion shaft 305 provides a solid mechanical steering connection for the device. Note that while the fluid passage to and from the cylinder is shown in representational form as hard piping or hoses, such connections could equally well be made in total or part by passages within the body 300 of the device. This construction is shown in FIG. 5.

Through a slight reorientation of the pressure feed and/or C1 324 and C2 325 communication grooves it is possible to pressure balance the valve member 304. One way to accomplish this is to have both the C1 and C2 grooves on a single side of the valve member, each groove C1, C2 individually having roughly the same surface area X, with a substantially equal area pressure feed on the opposing side of the valve member. As shown in FIG. 5 this can be accomplished with one pressure feed seal 343 located asymmetrically down on the opposing side of the valve member 304A asymmetrically in respect to the other pressure feed seal 344. By having the surface areas pressurized individually by C1 324A, C2 325A on one side of the rotor and the surface area pressurized by the pressure feed 334 on the other side of the rotor all substantially equal by such asymmetrical location of the seal 343 the pressure on the opposing sides of the valve member 304A will be balanced during the operation of the valve regardless of whether C1 324A or C2 325A is pressurized. Note that although the embodiment of FIG. 5 is shown with the second pressure seal 344 located radially outward of the valve member 304A and with a radial pressure feed, one could equally well locate the seal 344 on the same surface as the C1 and C2 grooves. (One ideally would locate such seal 344 so near to the outer edge 345 of the valve member 304A that no additional compensation for pressurized area would be necessary in the location of the first pressure seal 343). Such same surface location would remove the need for the close tolerance fitting of the valve member 304A within the valve cavity 316 and allow such valve member to float as in the device of FIG. 1. The same sort of pressure balancing could be produced by moving the entire pressure feed to the side of the valve member 304A opposite the C1 324A and C2 325A grooves. Again the surface area pressurized by the pressure feed would be substantially equal to the individual areas pressurized by the C1 or C2 grooves respectively so that no matter which groove C1 or C2 was pressurized one again would produce substantially equalized pressure loading on the valve member 304A.

Figure 6:
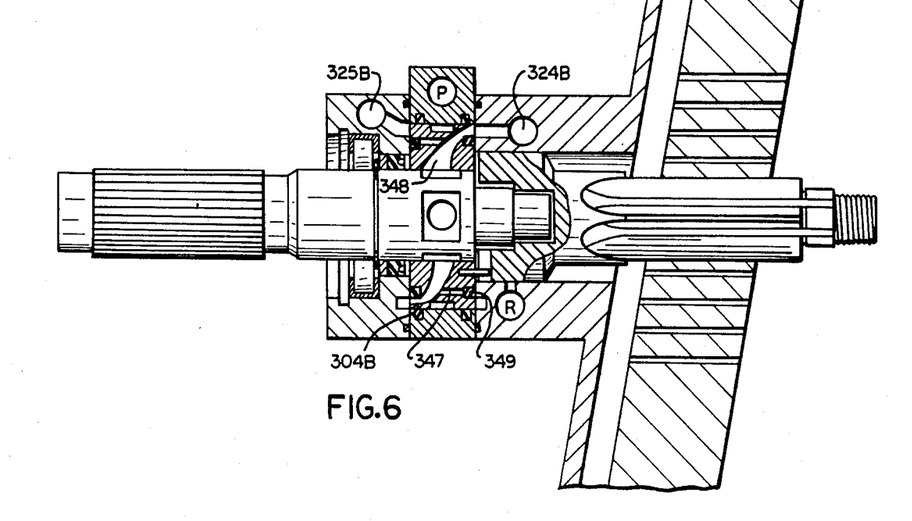

An additional way to pressure balance the valve member is to include pressurized seals opposing the C1 and C2 commutation grooves as shown in FIG. 6. In this embodiment the commutation grooves C1 324B and C2 325B grooves are located on opposing sides of the valve member 304B. Small auxiliary passages 347 extend off of the C1 and C2 passages 348 within valve member 304B to terminate on the inner sides of certain seals 349. The seals 349 move like pistons in respect to the valve member 304B. The outer surface area of the seals 349 is substantially equal to the respective commutation area of the C1 324B and C2 325B commutation grooves. Therefor if the groove C1 324B is pressurized the pressure also pressurizes the inner sides of the corresponding seal 349 on the opposing face of the valve member 304B. Since the areas so pressurized are substantially equal, the valve member 304B is pressure balanced. The same thing happens if the groove C2 325B and its corresponding seal 349 are pressurized. As an alternative the passages 347 could pressurize equalization grooves on the opposing side of the valve member 304B instead of the seals 349. This alternative would, however, necessitate additional seals on such opposing face or a reduced efficiency due to fluid bypass. (Since the pressure is fed radially of the valve member 304B such feed does not axially imbalance the valve member 304B. Such feed is therefor of no real concern. Again the location of the seals could be changed to the sides of the valve member 304B to allow it to float as in the device of FIG. 1.)

Note that in the more sublime versions of pressure balancing the valve member 304 would be pressure balance optimized for the maximum performance. For example if 75% of the time the valve member was rotated plus or minus 15 degrees in respect to the valve seat, one would select surface areas on opposing sides of the valve member to pressure balance it for this condition, accepting the limited pressure imbalance for pressure values under or exceeding the condition. Under these more sublime versions one would have differing balancing groove parameters for a race car (mostly straight line operation), a small commuter car (constant direction change) or an industrial tractor (limited periods of lock to lock direction change).

The pressure balancing of the valve member 304 reduces the wear on the device, increases the efficiency by reducing fluid leakage and otherwise improves the functioning of the device.

Another alternate embodiment of the device of FIG. 1 is disclosed in FIGS. 7-12. In this device the valve member is connected to the drive shaft (instead of the pinion shaft as in FIG. 1) and the valve seat is connected to the pinion shaft (instead of the drive shaft as in FIG. 1). In addition, a free floating coupling ring connects the valve member to the drive shaft, the spring connection utilizes coil springs, and the valve member is of laminated plate construction.

Figure 7:
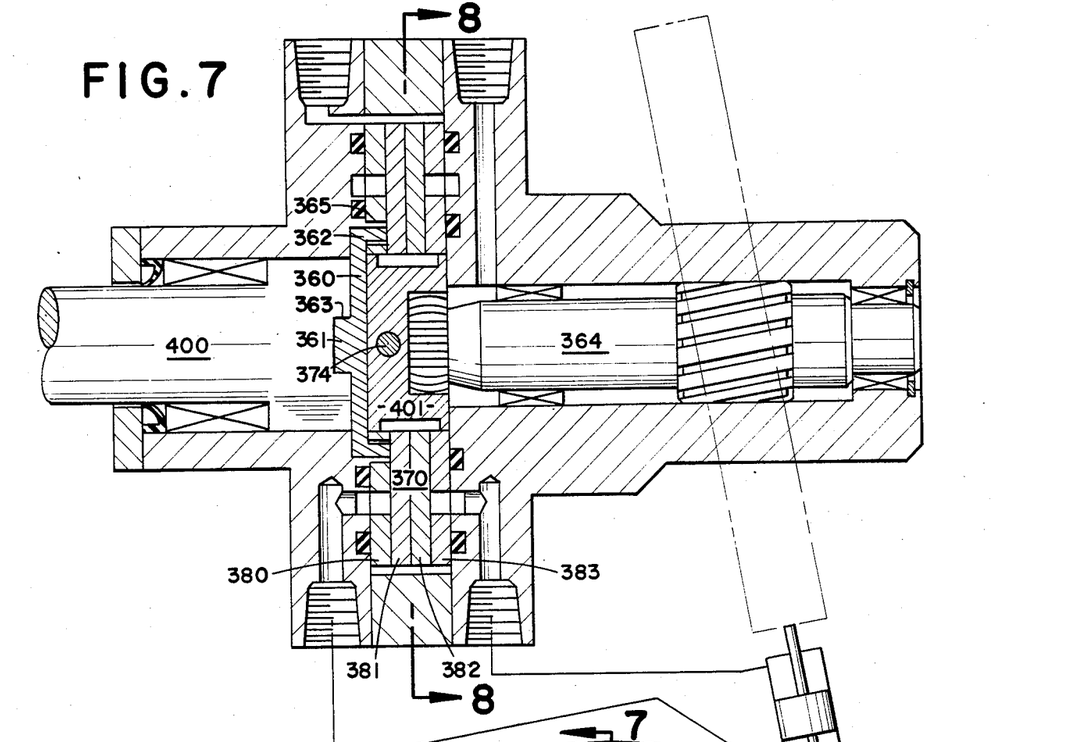
FIG. 7 is a central longitudinal cross-sectional view of a hydrostatic rack and pinion steering device like FIG. 1 with an alternate type of construction. The view is taken along lines 7—7 in FIG. 8.
Figure 8:
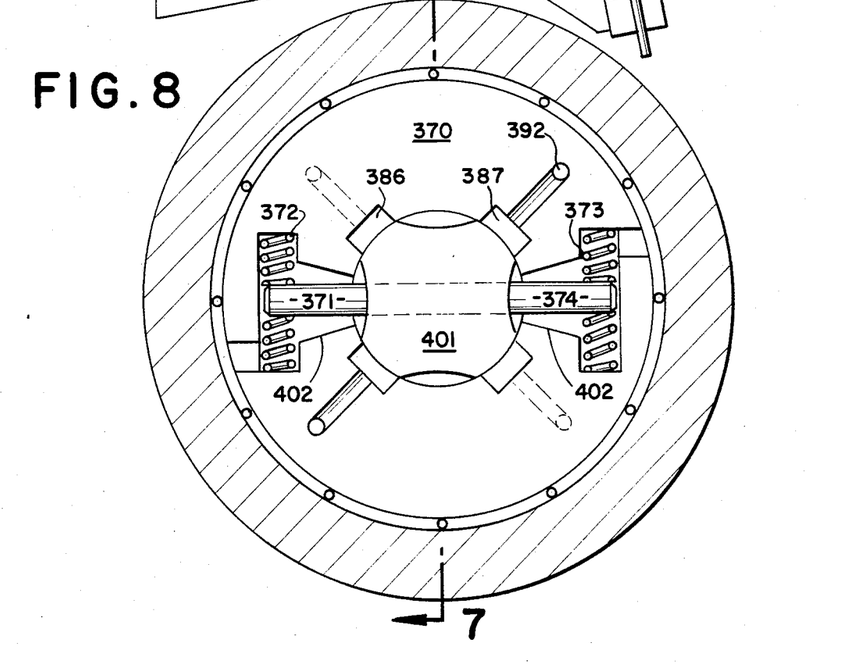
FIG. 8 is a cutaway cross-sectional view of the device of FIG. 7 taken generally along lies 8—8 of that figure.
Figure 9:
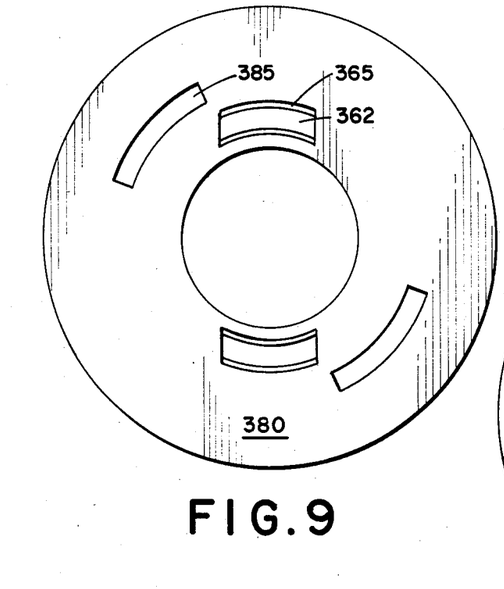
FIGS. 9-12 are sequential views of the laminated rotor of the device of FIG. 7.
Figure 10:
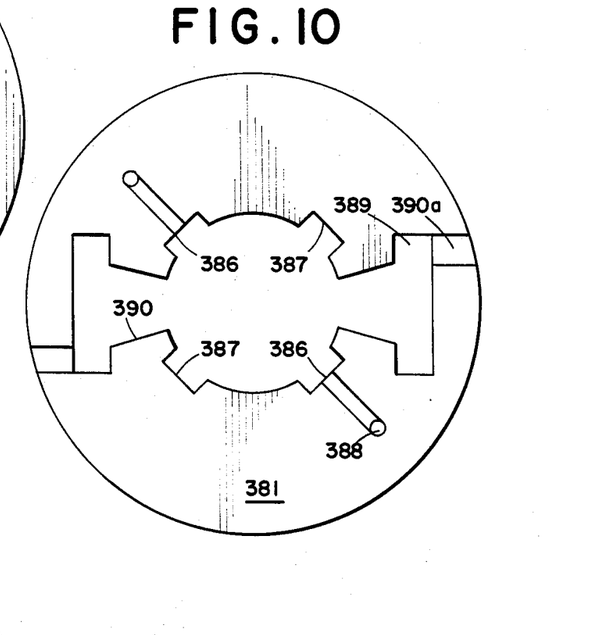
Figure 11:
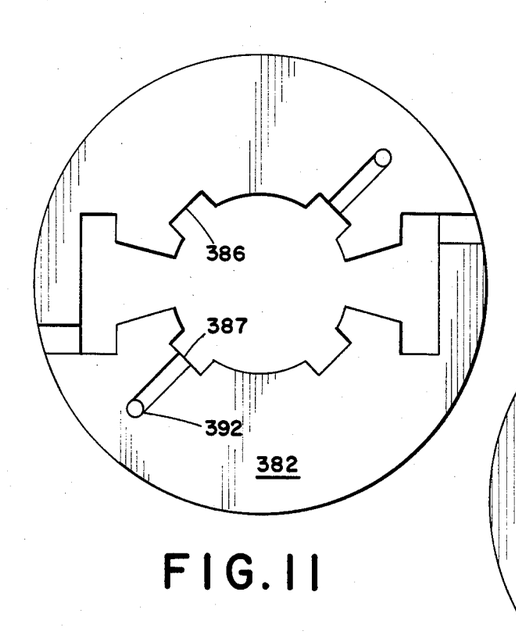
Figure 12:
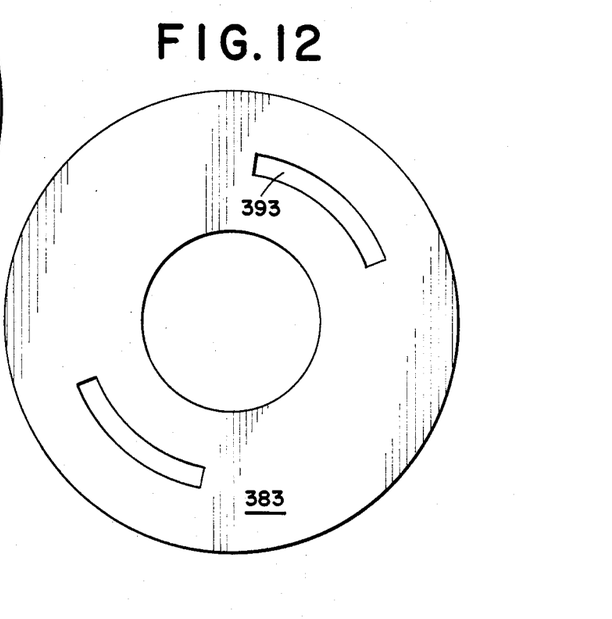
Figure 13:
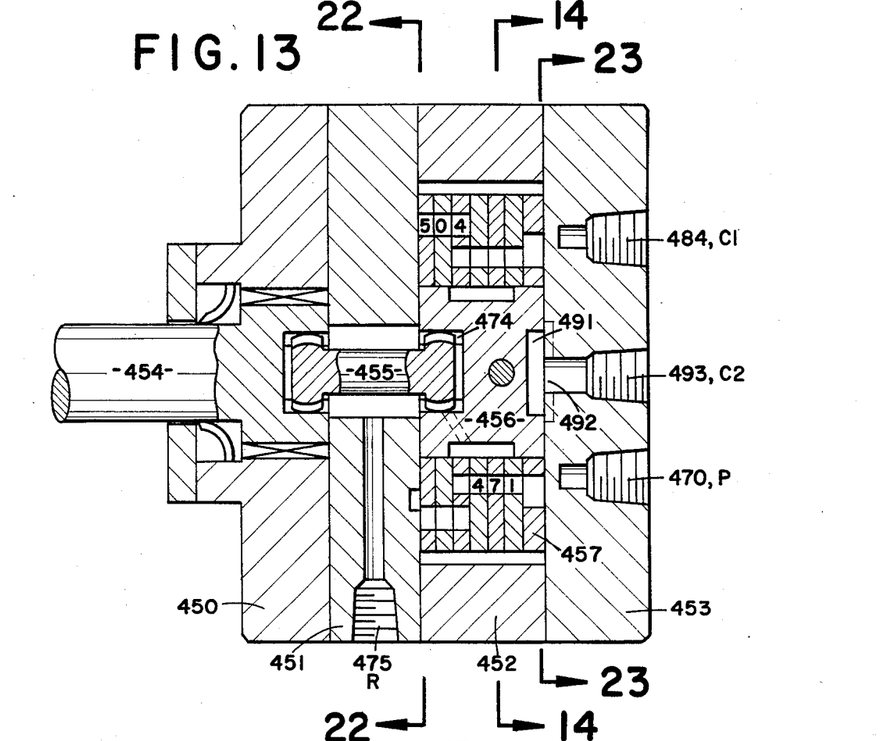
FIG. 13 is a central longitudinal cross-sectional view of a gerotor feedback hydrostatic steering device.
Figure 14:
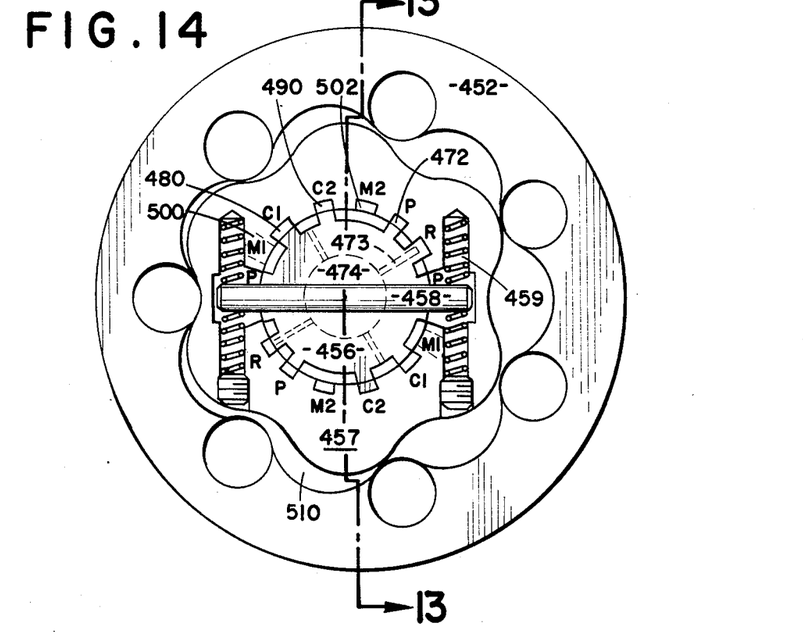
FIG. 14 is a cutaway cross-sectional view of the device of FIG. 13 taken generally along lines 14—14 of that figure.
Figure 15:
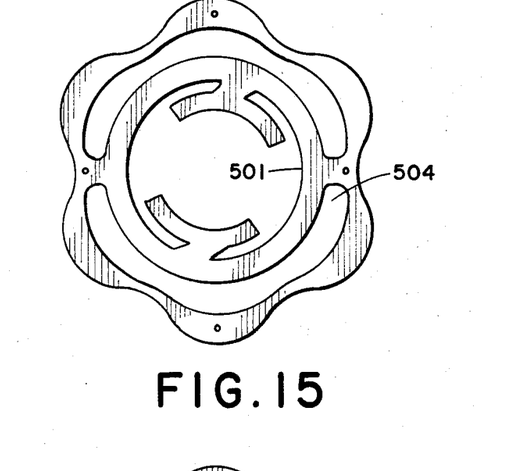
FIGS. 15-21 are sequential views of the laminated rotor of the device of FIG. 13.
Figure 16:
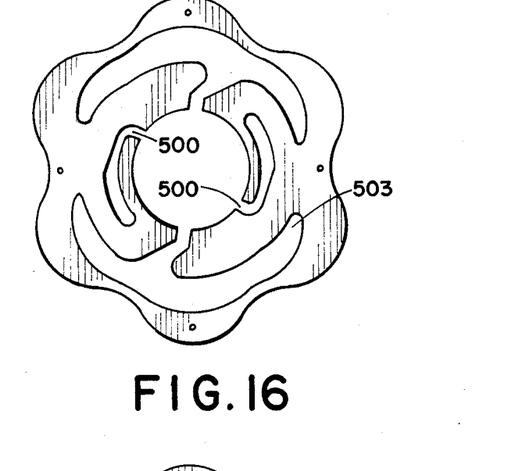
Figure 17:
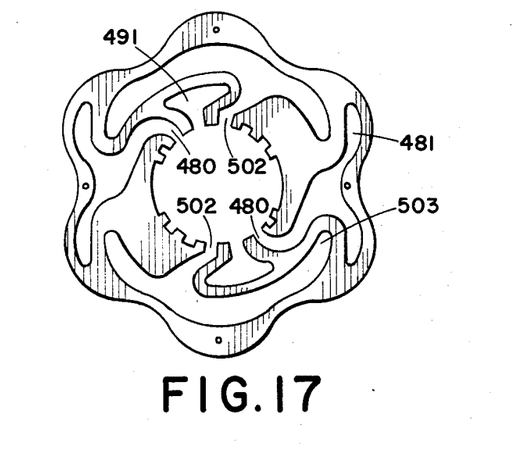
Figure 18:
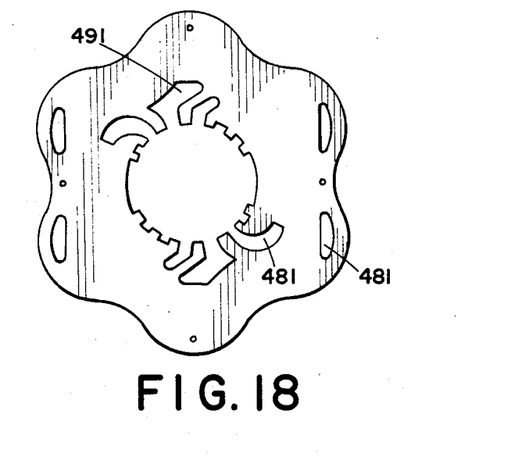
Figure 19:
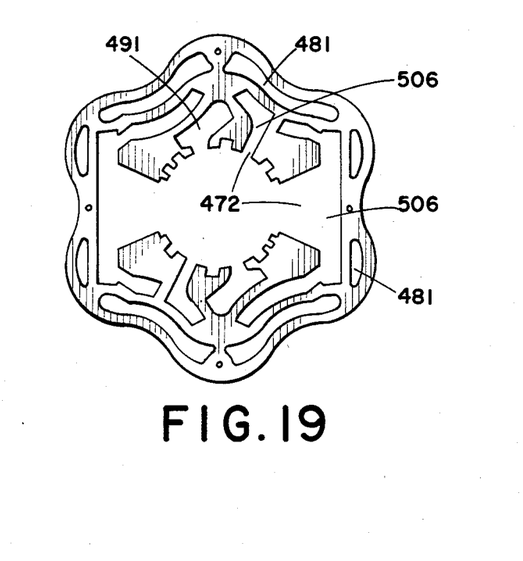
Figure 20:
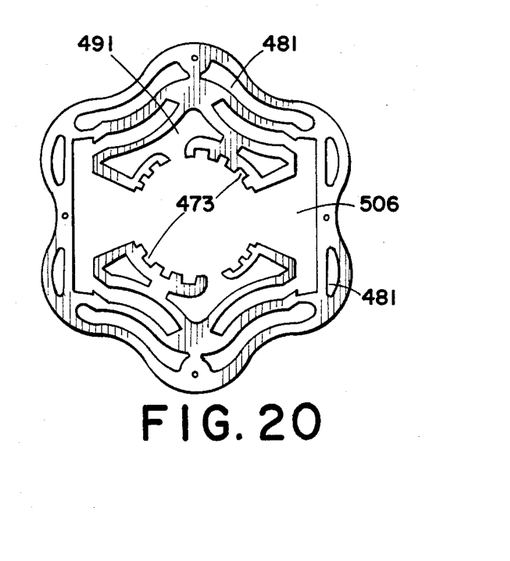
Figure 21:
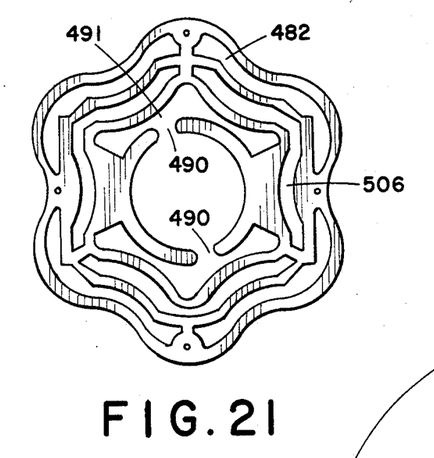
Figure 22:
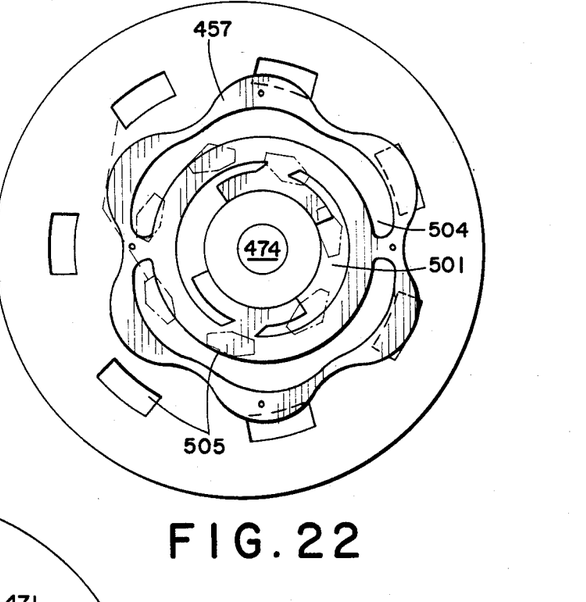
FIG. 22 is cross-sectional views of the device of claim 13 taken generally along lines 22—22 of that figure.
Figure 23:
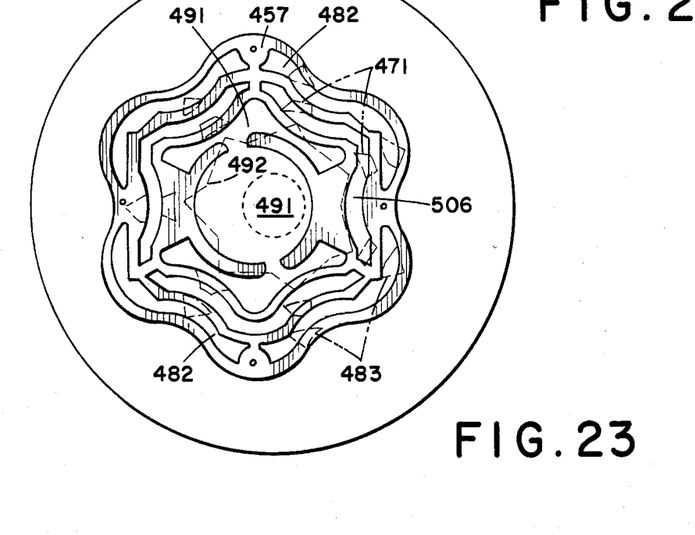
FIG. 23 is a cross-sectional view of the device of claim 13 taken generally along lines 23-23 of that figure.

The device of FIGS. 1-4 was shown and described as having the valve seat connected directly to the drive shaft and the valve member indirectly connected to the pinion shaft. This device could also be constructed by interchanging the interconnections of the various members. Such alternate interconnections are shown in FIG. 7. In this alternate interconnection the valve member 370 is connected to the drive shaft 400 and the valve seat 401 is connected to the pinion shaft 364. (The valve operates by rotation of the valve member in respect to the valve seat instead of vice versa as the device in FIG. 1.)

The valve member 370 is connected to the drive shaft 400 with a coupling ring 360. The free floating coupling ring 360 of this alternate embodiment is a circular ring with two pair of opposing flanges 361, 362 extending axially off the opposing sides thereof. One 361 of the pair of opposing flanges is drivingly connected to a groove 363 in the pinion shaft 364. The other 362 of the pair of opposing flanges is drivingly connected to a groove 365 in the valve member 370. As in the embodiment of FIG. 1 this second groove 365 allows for the flanges 362 to move radially inwards and outwards of the valve member 370. This free floating coupling ring 360 performs the function of the pin 317 of the embodiment of FIG. 1 (as well as the lost motion connection as will be later described).

The spring connection 371 of this alternate embodiment utilizes two pairs 372, 373 of coil springs at opposing ends of a heavy pin 374 between the heavy pin 374 and the valve member 370. This spring connection 371 performs the function of the "C" shaped torsion member 330 of the embodiment of FIG. 34.

The valve member 370 of this alternate embodiment is of multi-plate construction. As shown in FIG. 7 and in FIGS. 9-12, the valve member 370 is fabricated of a series of four plates 380,381,382,383 brazed together to form a unitary piece. Four plates are formed in a selected cross-sectional pattern. The first plate 380 includes a segmented commutation ring 385 and the free floating coupling ring engagement grooves 365. The second plate 381 includes C1 and C2 grooves 386,387, passages 388 to connect the grooves C1 (386) to the commutation ring 385 in plate 380, a spring cavity 389 and a drive cavity 390. Small grooves 390a extend from the drive cavity 390 to connect such cavity to the pressure port 391. The third plate 382 is similar to the second plate 381 except that passages 392 connect the grooves C2 (387) to a commutation ring 393 in plate 383. Plate four 383 has a segmented commutation ring 393.

The multi-plate valve member 370 performs the function of the valve member 304 and of the lost-motion type connection 350-351 of the embodiment of FIG. 1. (The valve member 370 performs the function of the lost-motion connection 350-351 of transferring physical force from the drive shaft 400 through coupling ring 360 to the valve member 370 thence through the sides 402 of the drive cavity and the heavy pin 374—valve seat 401 to the pinion shaft 364. There is no direct lost-motion connection between the drive shaft 400 and pinion shaft 364 of this alternate embodiment.)

FIGS. 13-23 disclose a fully hydraulic alternative embodiment similar to the embodiment of FIGS. 7-12. In this device a gerotor structure replaces the rack and pinion steering mechanism. The body of this device includes a face plate 450, a laminated valving plate 451, a stator 452 and an end plate 453. The main operative members are an input shaft 454, a wobble stick 455, a valve seat 456 and a valve member-rotor 457. The input shaft 454 is rotatably mounted to the face plate 450. The valve seat 456 is concentrically rotatively mounted within the valve member-rotor 457 which in turn fits within the stator 452. To ease understanding of the valving of the device the valve seat in FIGS. 13 and 14 has been enlarged. The wobble stick 455 connects the input shaft 454 to the valve seat 456. The valve seat 456 itself is mechanically connected to the valve member-rotor 457 via a heavy pin 458 and coil springs 459 in a fashion similar to the heavy pin 374 and springs 372-373 of the embodiment of FIG. 7.

The rotor 457 and valve seat 456 are the main operative pieces of this fully hydrostatic device. As shown in FIGS. 15-23 the pressurized fluid enters the device through port 470 to pressurize a series of commutation holes 471 on one side of the end plate 453. From the holes 471 the pressurized fluid passes through a segmented passage 506 in the valve member-rotor 457 to pressurize the P grooves 472 in the valve member-rotor 457. The return fluid passes from the R grooves 473 in the valve seat 456 and valve member-rotor 457 through a commutation hole 474 on the other side of the valve seat 456 (the gaps and holes in the wobble stick 455 valve seat 456 drive connection) to exit the device via the return port 475. The cylinder 1 grooves 480 in the valve member-rotor 457 pass through passages 481 within the valve member-rotor 457 to a second segmented commutation passage 482 on the pressure port side of the valve member-rotor 457. This second passage 482 communicates through a set of commutation holes 483 in the end plate 453 to the C1 port 484. The cylinder 2 grooves 490 in the valve member-rotor 457 abut an inner commutation ring 491 which connects with a star-shaped opening 492 in the end plate 453 and thus the C2 port 493. The M1 groove 500 abuts an inner valving ring 501 on the return side of the valve member-rotor 457. The M2 groove 502 connects through the valve member-rotor 457 via passages 503 to the outer valving ring 504 on the return side of the valve member-rotor 457. These two valving rings 501, 504 selectively communicate with the expanding contracting gerotor cells 510 (as respectively appropriate) through the valving openings and valving passages 505 in the laminated valving plate 451 (see FIG. 22). The details of this valving plate 451 are laid out later on in this application (and Mr. White's U.S. Pat. No. 4,474,544 issued Oct. 2, 1984).

This fully hydrostatic device of FIGS. 13-23 operates in a manner similar to that of the rack and pinion embodiments except that the return and fail safe operation is fluidic instead of mechanical.

FIGS. 24-30 disclose fully hydraulic gerotor driven hydrostatic steering devices incorporating the teachings of this application. In most of these devices, a gerotor replaces the cylinder driving the rack and pinion mechanism.

Figure 24:
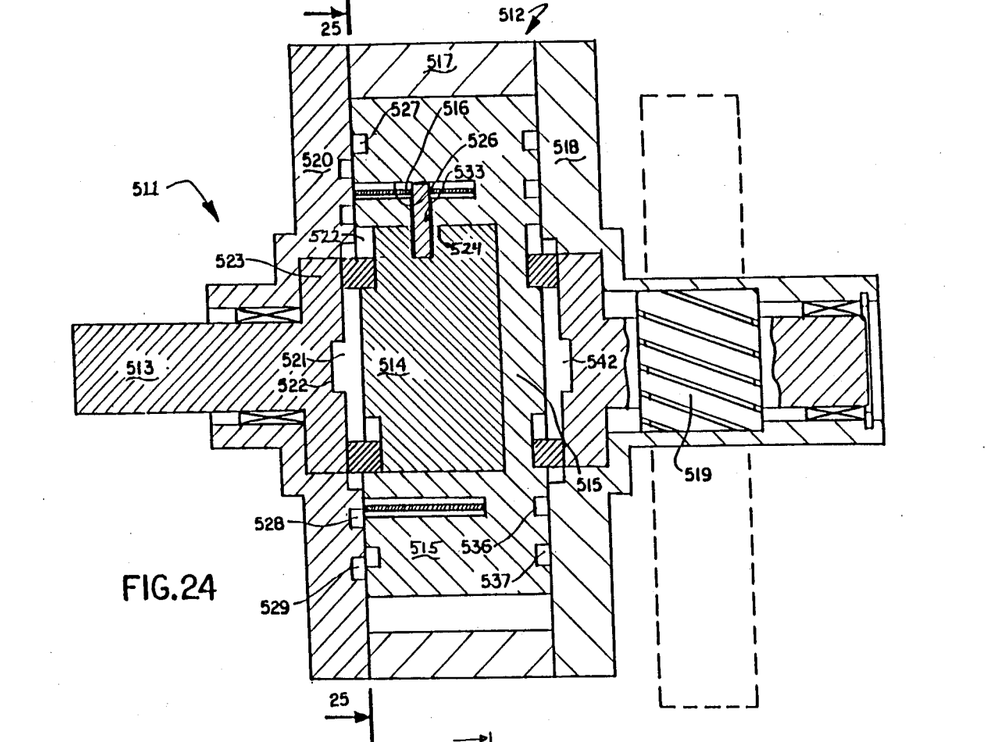
FIG. 24 is a central longitudinal cross-sectional view of a hydrostatic rack and pinion steering device like FIG. 1 incorporating a torque generator.
Figure 25:
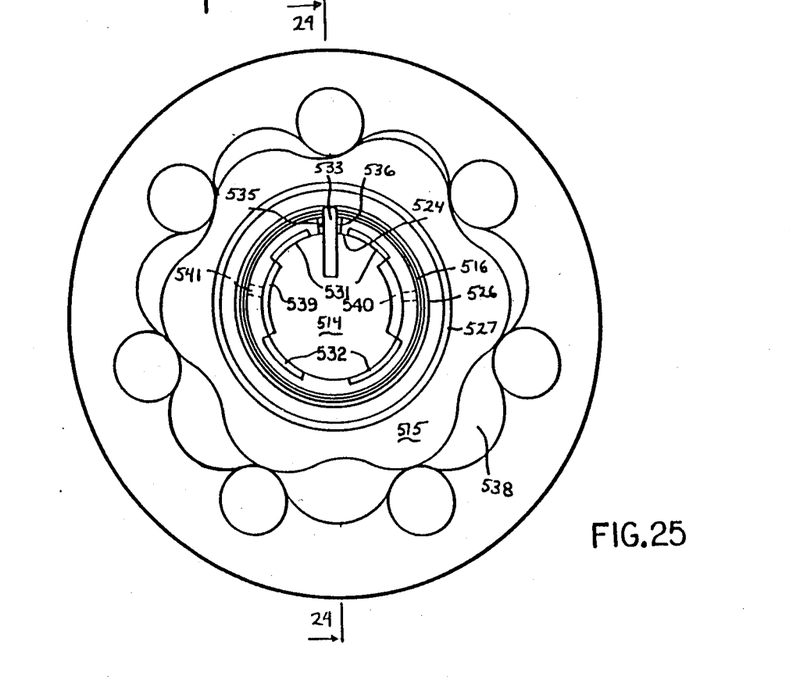
FIG. 25 is a cutaway cross-sectional view of the device of FIG. 24 taken generally along lines 25—25 of that figure.

FIGS. 24-25 disclose a gerotor torque generator device 511. This device 511 includes a housing 512, an input shaft 513, a rotary valve 514, a rotor 515, a "c" spring 516, a stator 517, a valving plate 518 and an output pinion 519. The valve 514 is radially captured in the gerotor cavity within the central core of the rotor 515 axially between a commutation end plate 520 and the rotor. The rotor 515 circumferentially surrounds the valve 514 incorporating the functioning of the valve member 304 of the device of FIG. 1. The valve member 514 is rotatably connected to the input shaft 513 through an old ham coupling 521. As with the pin 317 of FIG. 1 this coupling 521 rotatively connects the valve 514 to the rotary shaft 513 while compensating for any axial misalignment therebetween. The old ham coupling 521 engages radially extending slots 522 in an enlarged portion 523 of the input shaft 513 and in the valve 514. These slots 522 allow the valve 514 to float following the orbital motion of the rotor 515 while at the same time rotating with any rotation of the input shaft 513.

The rotor 515 and valve member 514 form a valve seat 524 at their intersection. As with the other devices of this application this valve seat selectively connects the fluid source to the steering device.

Fluid arrives at the valve seat from one flat side of the rotor 515 through concentric pressure 526 and return 527 grooves communicating through pressure 528 and return 529 grooves respectively in the commutation plate 520 of the housing 512 to external opening pressure and return hydraulic ports (not shown). The pressure 526 and return 527 grooves in the rotor 515 then connect through passages (not shown) in the rotor 515 to pairs of symmetrically places valving passages P 531 and R 532 on the central core of the rotor 515.

Fluid travels from the valve seat 524 to the steering device, in this case the rotor 515 itself, on the other flat side of the rotor 515 through concentric $C_1$ 536 and $C_2$ 537 valving grooves. These valving grooves $C_1$ 536 and $C_2$ 537 connect through a multi-plate valving plate 518 to expanding and contracting gerotor cells 538 between the rotor 515 and stator 517. This valving is taught in Mr. White's U.S. Pat. No. 4,474,544. The valving grooves $C_1$ 536 and $C_2$ 537 are fed from a pair of symmetrically placed valving passages $C_1$ 539 and $C_2$ 540 on the outer surface of the rotary valve 514 at the valve seat 524 via passages 541 in the rotor 515. With the pressure groove 528 on one side of the rotor and a pressurized groove ($C_1$ or $C_2$) on the other side of the rotor, the rotor is substantially pressure balanced during operation. This is preferred. Note that the fluidic connections could be modified to suit other needs. For example the plates 518, 520 could be swapped such that the valving occurs on the input shaft of the rotor, or the functioning of the plates 518, 520 could be combined in a single plate on one side of the rotor as in Mr. White's prior patent.

The output pinion 519 is drivingly connected to the rotor 515 through an old ham coupling 542. This coupling 542 passes operational and safety torque between the rotor 515 and the pinion 519.

The resilient connection for the device is created by the "c" spring 516. The circular "c" spring 516 is located in the pressure groove 526 of the rotor 515. The spring 516 connects with a pin 533 extending off of the valve 514 to provide the resilient connection between the rotor 515 and valve 514 (similar to the connection 330-333 in FIGS. 1-4). A torsion bar (as in FIG. 26) or other type of resilient connection could also be utilized. The pin 533 is located within a cone shaped cavity 535 extending off of the valve seat. This cone shaped cavity 535 allows clearance for the resilient movement of the pin 533. The pins 533 contact with the flat side walls 536 of the cavity 535 provide for the safety mechanical intersection between the input shaft 513 and pinion 519. The pin 533 thus also provides for part of the safety mechanical connection between the input shaft 513 and pinion 519 as will be later described.

In the operational mode the operator rotates the input shaft 513 in a chosen direction against the pressure of the spring 516. This rotates the valve 514 to selectively connect the $C_1$ 539 and $C_2$ 540 valving passages on the valve 514 to the pressure 531 and return 532 valving passages on the rotor 515 respectively. The selective connection of the $C_1$ and $C_2$ passages to the gerotor cells through the multi-plate valving plate 518 causes the rotor 515 (and thus the pinion 519) to rotate, accomplishing a turn in the chosen direction.

In the safety mode (as upon hydraulic pressure failure), rotation of the input shaft 513 mechanically rotates the rotor 515 (and thus the pinion 519) through the overwhelming the spring 516 and physically pushing the pin 533 against the sides 536 of the cone shaped cavity 535 in the rotor 515. This provides a lost-motion safety connection.

Figure 26:
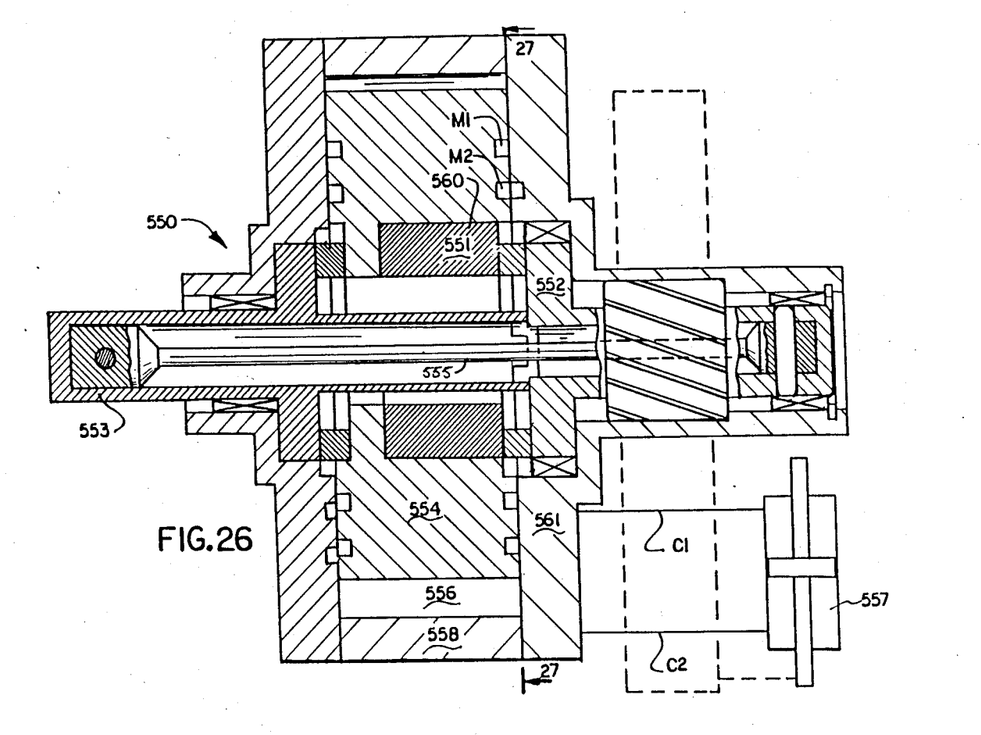
FIG. 26 is a central longitudinal cross-sectional view of a hydrostatic rack and pinion steering device like FIG. 24 incorporating a reactionary design.
Figure 27:
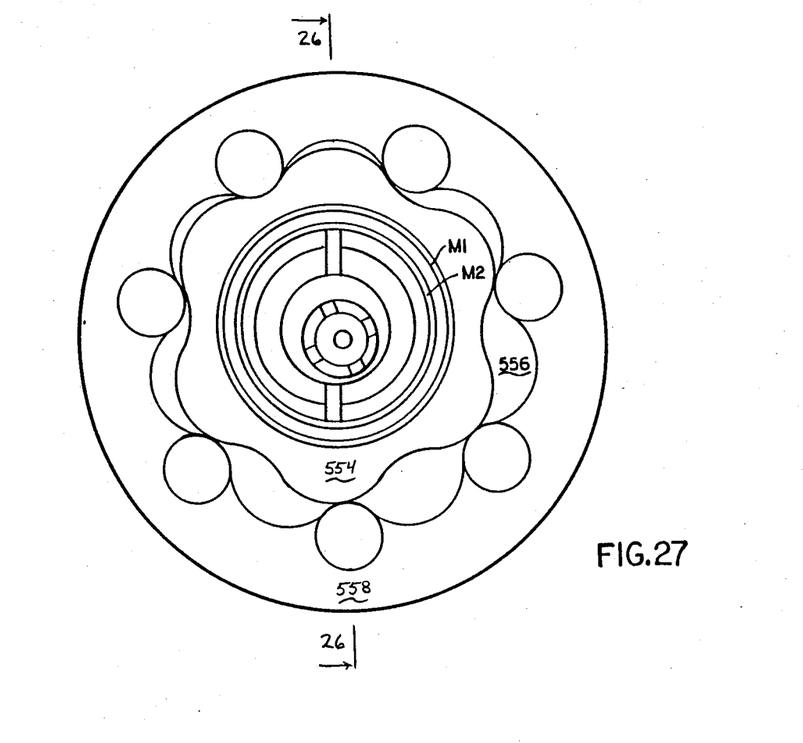
FIG. 27 is a cutaway cross-sectional view of the device of FIG. 26 taken generally along lines 27—27 of that figure.

FIGS. 26 and 27 disclose a gerotor reactionary device 550. This device is similar to a combination of the valving of gerotor feedback hydrostatic steering device of FIG. 13 and the device of FIG. 26. The Device operates with an overall operation similar to the reactionary device of FIG. 7.

In the gerotor reactionary device of FIG. 26 the input shaft 553 is connected to the rotor 554 and the valve 551 is connected to the pinion 552. There are fluidic valving passages at the valve seat 560 between the valve 551 and the rotor 554 similar in layout and functioning to the valve of FIG. 13. As with FIG. 13 the metering valve openings $M_1$, $M_2$ are connected to the gerotor cells 556 through a valving pate 561 and the cylinder valve openings $C_1$, $C_2$ are connected to an external cylinder 557. In a point of departure, however, the actual metering valving seats are altered such that after a certain degree of rotation (and/or pressure differential between $M_1$ and $M_2$), there is no reactionary force passed to the operator through the rotor: the device acts just to valve the cylinder by effectively valving the pressure and return fluid sources directly to the steering cylinder 557. This feature can be accomplished by an extra set of ports to dump fluid directly between $M_1$, and $M_2$ after a certain degree of rotation, tapered valving seats, a pressure operated pop off valve set to trigger at a certain preset or programmed $M_1$, $M_2$ pressure differential (for example a 250 psi $M_1$, $M_2$ pressure differential in a 0.4 cu gerotor device) or otherwise. The reason for this feature is that up to a certain amount of feedback one wants reaction: above reaction reduces steering performance. For example for low angular displacement—a degree or so—reaction is desirable. Afterwards it numbs and can even overcome an operator's control. Therefor up to a chosen amount of steering angle or force one utilizes the $M_1$, $M_2$ differential for reaction. Above this one does not. With the connection of the rotor 554 directly to the input shaft 553 and the gerotor cells 556 metered with the cylinder 552, forces on the fluid passing through the gerotor cells of the device will be felt by the operator of the device. Since in the particular device shown and described some of the fluid to and from a cylinder 557 is fed metering the gerotor cells 556 between the rotor 554 and stator 558, there is a tactile feedback to the operator of road conditions and wheel motion. In general higher the pressure to move or fed back from the load, the more torque it would take to hold or rotate the input shaft. This provides a feel for the road to the operator. Otherwise this reactionary device of FIG. 26 operates similarly to the device of FIG. 7.

To operate this reactionary device of FIG. 26, the operator rotates the input shaft 553 and rotor 554 against the fluid in the gerotor cells 556 and the tension of the torsion bar 555 (or other resilient connection). Since the valve 551 is held stationary by the pinion 552, this rotation causes the selective connection of the metering $M_1$, $M_2$ and cylinder $C_1$, $C_2$ chambers with the pressure and return fluid sources to valve the device. Since the valve 551 is connected to the pinion 552, the valving of the cylinder 557 of the device also acts to return the valve to neutral via rotation of the valve 551. The degree and speed of tactile feedback to the operator of the reactionary device can be controlled by the pressure differential between $M_1$ and $M_2$ as metered through the gerotor cells. The greater the differential, the greater the degree of tactile feedback. By providing tactile feedback the device removes a fault of hydraulic steering devices.

Figure 28:
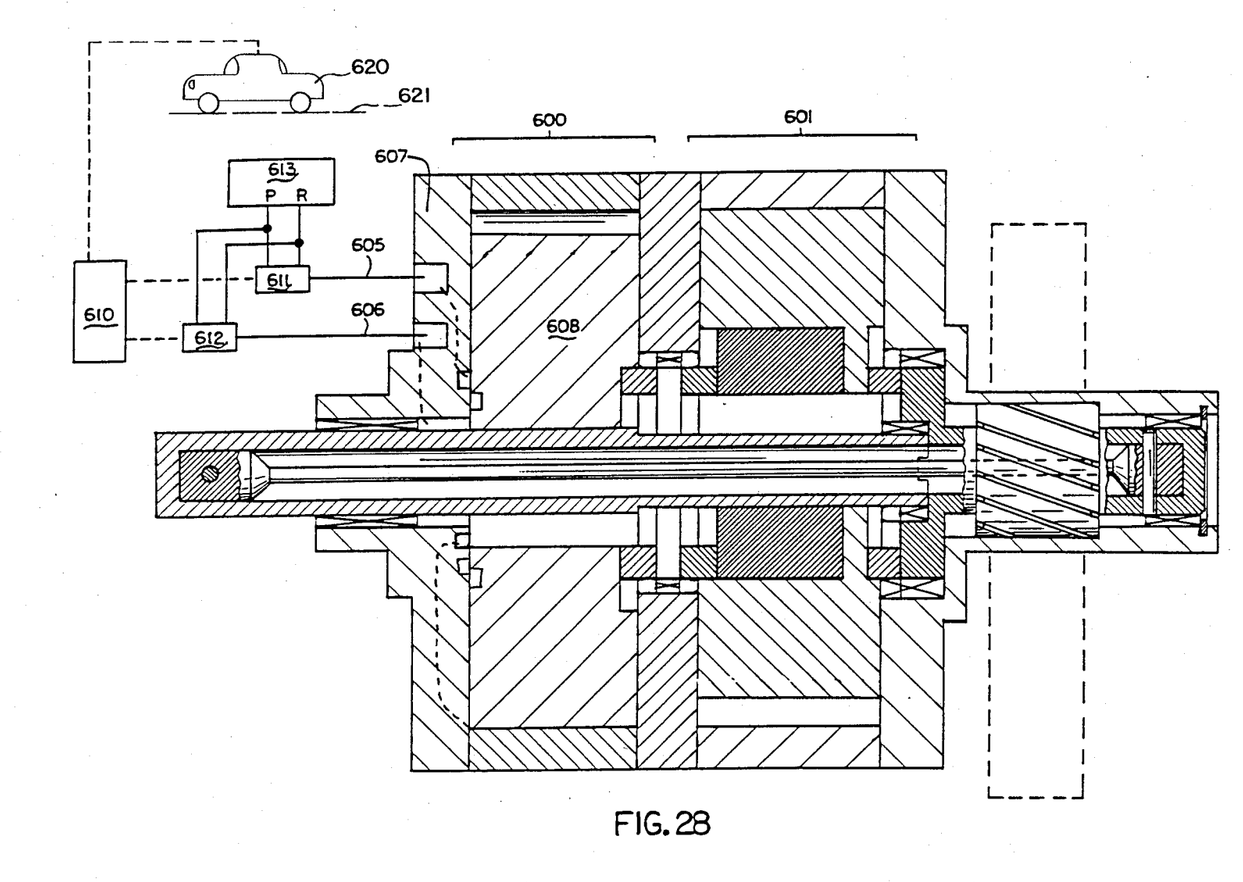
FIG. 28 is a central longitudinal cross-sectional view of a valving override rotor torque generator hydrostatic rack and pinion steering device.

FIG. 28 discloses a rotor input override gerotor hydrostatic rack and pinion power steering device. Although the input override section 600 is disclosed with a torque generator type device 601 similar to that of FIGS. 24-25, the input override could equally well be incorporated into a reactionary device similar to FIGS. 26-27 or other power steering device amenable to a rotary control (recirculating ball, lever, etc.). The input override rotor 600 is utilized to provide a tactile feedback to the operator and/or, in addition, to provide an override control of the interconnected power steering device (such as 601).

In the actual device shown 600 two hydraulic connections 605, 606 connect through a multi-plate single plane commutation and valving plate 607 to the input override rotor 608. The actual commutation and valving is taught in Mr. White's prior U.S. Pat. No. 4,474,544 (one connection 606 to the center of the rotor, the other connection 605 through a commutation groove to a valving groove on the rotor, the center and valving groove on the rotor selectively connecting through a set of manifold ports to the gerotor cells). The volume, pressure and direction of the fluid plumbed through the two hydraulic connections will ordinarily be under microprocessor control.

In the device diagrammatically shown in FIG. 28 a microprocessor 610 controls two three way valves 611, 612 between a fluid pressure source 613 and the device 600. Ideally the pressure source 613 is the same as for the interconnected device 601. Indeed all valving and plumbing would be in one device (save maybe the source of pressure). The microprocessor 610 is fed data in respect to the everchanging variables associated with automobiles 620 traveling over a plane 621 such as speed, direction of wheel turning, angle of tip, etc. to select an amount and direction of input override based on built in or operator designated programming. This programming can vary from the simple—straightening the wheels when the car would otherwise turn over-to the sublime-providing an ever greater resistance to motion and an increase in return force upon increasing vehicle speed. (The later would range from a negative feedback aid to rotation at no speed, an aid to parking lot maneuvering, to a high positive resistance feedback at high speed, an aid to high speed driving.) This would be true for both a torque generator steering device (FIG. 24), a reactionary steering device (FIG. 26) or otherwise. The resistance could increase at a straight line, proportional, logarithmic or other amount.

Figure 29:
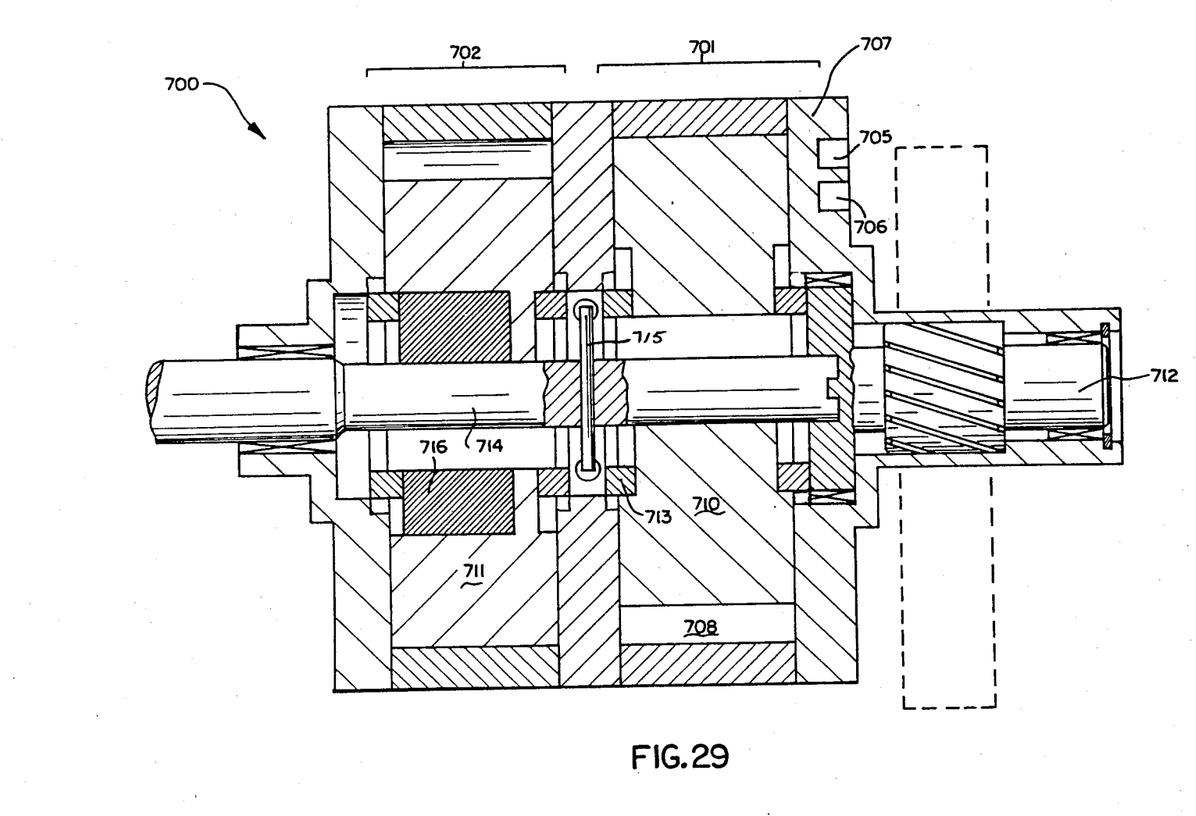
FIG. 29 is a central longitudinal cross-sectional view of a pinion override torque generator hydrostatic rack and pinion steering device.

FIG. 29 discloses a rotor output override gerotor hydrostatic rack and pinion power steering device. This again provides an override control of the interconnected power steering device.

In the actual device shown 700 the output override 701 is incorporated into a torque generator steering device 702 similar to that in FIG. 24 (again alternate steering devices could be substituted). The override rotor 710 of the device 701 is directly rotatively connected between the steering rotor 711 and the output pinion 712 through an intermediate old ham coupling set 713 freely rotating about the extended input shaft 714. The resilient connection 715 of the steering device 702 is located between the intermediate old ham coupling set 713 and the input shaft 714 similar to the resilient connection of FIG. 8. As the output override rotor 710 is directly rotatively connected to the pinion 712, this is the equivalent of a direct resilient connection to the pinion 712 as in the torque generator device of FIG. 24. Two ports 705, 706 again connect through a single plane commutation and valving plate 707 to expanding and contracting gerotor cells 708 to rotate the output override rotor 710. As the output override rotor 710 is directly connected between the steering rotor 711 and the pinion 712, any force applied to the override rotor 710 directly affects the steering of the vehicle to which the device 700 is connected. As in FIG. 28 the force is ideally manipulated by microprocessor controlled valves (not shown). This force can be negative by applying an active counter force or a passive resistance to the rotation of the override rotor 710. This force can also be positive by applying an active positive force or aid to the rotation of the override rotor 710. Again the exact operating parameters would be chosen to match the desired results. In the absence of any override force, the override rotor 710 is effectively removed from the system—the power of the steering rotor 711 is transferred to the pinion through the override rotor 710 without dimmutation. By directly controlling the steering of the vehicle instead of the valving (as with the input override rotor of FIG. 28), the output override rotor 710 provides more direct control of the vehicle than otherwise.

Figure 30:
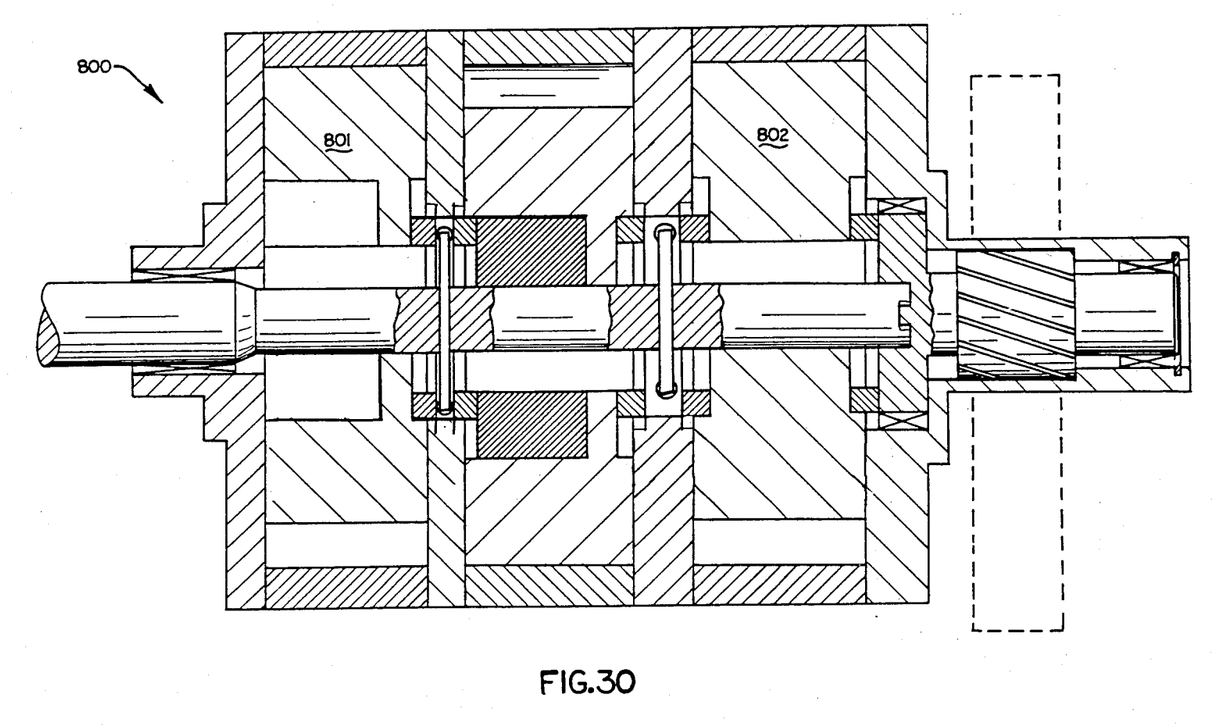
FIG. 30 is a central longitudinal cross-sectional view of a three-rotor control and override hydrostatic steering device.

FIG. 30 is a device 800 similar to that of FIG. 29 incorporating both input 801 and output 802 override rotors. This device would be utilized if one desired the tactile feedback and/or the valving control of an input override rotor 801 in combination with the direct steering control of an output override rotor 802 in a single vehicle. An ideal application for this steering control 800 would be in a four wheel steering vehicle. In such a vehicle the input rotor 801 would be utilized to provide tactile feedback along with a high-low speed alteration of steering parameters while the output override rotor 802 would act to limit or prevent steering if the vehicle would over control or turn over if unlimited steering was permitted. Virtually unlimited control is possible with the manipulation of these override rotors 801, 802.

Note that in this particular FIG. 30 the input override rotor 801 is shown as a valving rotor without the valve. As only one side of the rotor 801 is utilized for a solid mechanical drive, this usage presents no difficulties. Similarly in the rest of the figures the rotors and valving plates could also be reoriented, stacked and assembled in other various combinations to produce a long series of unique devices. To aid in this assemblage it is preferred that the rotors, whether valving or override, have similar commutation/valving grooves and old ham coupling slots so as to allow for their free interchange. It is also preferred that the commutation and/or valving passages of the device be contained in a series of flat, disk shaped plates (as in U.S. Pat. No. 4,474,544). This would allow one to bolt together a device with selective location of the fluid connections, commutation and valving for the device.

The override hydrostatic steering devices of FIGS. 28, 29 and 30 have been disclosed in torque generator type steering devices. As one skilled in the art would recognize, these input-output override controls could be incorporated in various combinations in any rotary operated steering device. For example: in FIG. 29 the valve 716 could be connected to the intermediate old ham coupling set 713 and a cylinder added to create a reactionary steering valve similar to that of FIG. 26 for the steering device 702. With this modified device the rotor 711 could be utilized as a reactionary rotor and, in addition, an override rotor by placing the amount and direction of the series connection of the $C_1$, $C_2$ cylinder chambers to the gerotor cells under selectable microprocessor control. This combination of reactionary and override features in a single rotor produces a more limited but simpler steering device. Other combinations of override, reactionary and torque generator features are also possible. In addition the locations of the various commutation and valving grooves and passages of the devices could be altered to suit the operating parameters, design restrictions, etc. For example: in FIG. 24, one could put all of the commutation and valving of plates 518, 520 on a single side of the device (i.e. insert the rotor valving as a variable double throw double connection valve in the rotor passages of Mr. White's single side commutation and valving of U.S. Pat. No. 4,474,544). Another example in FIG. 28 one could put all passages in a multi-plate section plate between the rotors 600, 601 (i.e., a single plane commutation and valving plate backing another single plane commutation and valving plate, each facing its respective rotor). Other fluid connections are also possible. Therefore, although this invention has been described in its preferred form with a certain degree of particularity, it is understood that the present disclosure of the preferred form has been made only way of example and that numerous changes in the details of construction and the combination and arrangement of parts may be resorted to without departing from the spirit and the scope of the invention as hereinafter claimed.

What is claimed is:

1. An improvement for a hydrostatic steering device including a control valve and an operational gerotor set having an orbiting rotor, the improvement comprising the rotor surrounding the control valve and the control valve orbiting with the rotor.

2. The improved hydrostatic steering device of claim 1 wherein the control valve is a rotary control valve.

3. The improved hydrostatic steering device of claim 1 wherein the control valve extends a certain axial length and characterized by the addition of a resilient connection between the control valve and the rotor, said resilient connection being located within the certain axial length of the valve of the device.

4. An improvement for a hydrostatic steering device including a control valve and an operational gerotor set having a rotor, a source of pressure and return fluid, gerotor cells about the rotor and a returning means, the improvement comprising the rotor surrounding the control valve, the control valve metering the pressure and return fluid to the gerotor cells and valving the pressure and return fluid to the steering means.

5. An improved hydrostatic steering device comprising a valve seat, a input shaft, means to connect said input shaft to said valve seat, a gerotor device, said gerotor device having a rotor and gerotor cells, said rotor surrounding said valve seat, said rotor and said valve seat forming a control valve at their joint, fluid pressure and return, means to connect said fluid pressure and return to said control valve, a fluid operated steering means and means for said control valve to selectively connect said fluid pressure and return to said steering means and metered to said gerotor cells so as to operate the steering device.

6. An improved hydrostatic steering device comprising a gerotor device, said gerotor device having a rotor and gerotor cells, said rotor of said gerotor device having an orbital motion, a valve seat, said rotor surrounding said valve seat, said rotor and said valve seat forming a control valve at their joint with said control valve having an orbital motion with said rotor, an input shaft, a wobblestick, said wobblestick connecting said input shaft to said valve seat of said control valve, fluid pressure and return, means to connect said fluid pressure and return to said control valve, a fluid operated steering means and means for said control valve to selectively connect said fluid pressure and return to said steering means and metered to said gerotor cells so as to operate the steering device.

7. The improved steering device of claim 6 characterized by the addition of a resilient connection between said valve seat and said rotor.

8. The improved steering device of claim 7 characterized in that said resilient connection includes a heavy pin.

9. An improved hydrostatic steering device, said device comprising a drive shaft, a valve seat, means to rotatably connect said valve seat to said drive shaft, a valve member-rotor, means surrounding and cooperating with the valve member rotor to form pressure cells for rotating the valve member-rotor, means to get fluid to and from said cells, said valve member-rotor surrounding part of said valve seat, said valve seat and valve member-rotor forming a valve at their joint, means to get fluid to said valve, means to get fluid from said valve, means within the location where said valve member-rotor surrounds said valve seat to resiliently connect said valve member-rotor to said valve seat for a certain degree of rotation, and means to lost-motion drivingly rotatably connect said valve member-rotor to said drive shaft after said certain degree of rotation.

10. An improved hydrostatic steering device, said device comprising a drive shaft, a valve seat, means to rotatably connect said valve seat to said drive shaft, a valve member-rotor means pressure forming cells for rotating the valve member-rotor, means to get fluid to and from said cells, said valve member-rotor surrounding part of said valve seat, said valve seat and valve member-rotor forming a valve at their joint, means to get fluid to said valve, means to get fluid from said valve, means within the location where said valve member-rotor surrounds said valve seat to resiliently connect said valve member-rotor to said valve seat for a certain degree of rotation, said means to resiliently connect said valve member-rotor to said valve seat including a drive cavity and a pin, said drive cavity being in said valve member-rotor, said pin extending from said valve seat into said drive cavity in said valve member-rotor, means to resiliently connect said pin to said valve member-rotor and means to lost motion drivingly rotatably connect said valve member-rotor to said drive shaft after said certain degree of rotation.

11. The improved hydrostatic steering device of claim 10 characterized in that said means to resiliently connect said pin to said valve member-rotor comprises a pair of springs, said drive cavity having two sides, and one of said pair of springs extending between said pin and one side of said drive cavity and the other of said pair of springs extending between said pin and the other side of said drive cavity.

12. The improved hydrostatic steering device of claim 10 characterized by the addition of a stop means to said drive cavity and wherein said pin and said stop means are the solid lost-motion drive connection between said drive shaft and said valve member-rotor.

13. The improved hydrostatic device of claim 10 wherein there is a fluid passage in the valve member-rotor and characterized in that the fluid passage includes said drive cavity.

* * * * *